Oct. 22, 1963   HANS-JOACHIM M. FOERSTER   3,107,555
CHANGE SPEED TRANSMISSION
Filed Oct. 14, 1957   2 Sheets-Sheet 2
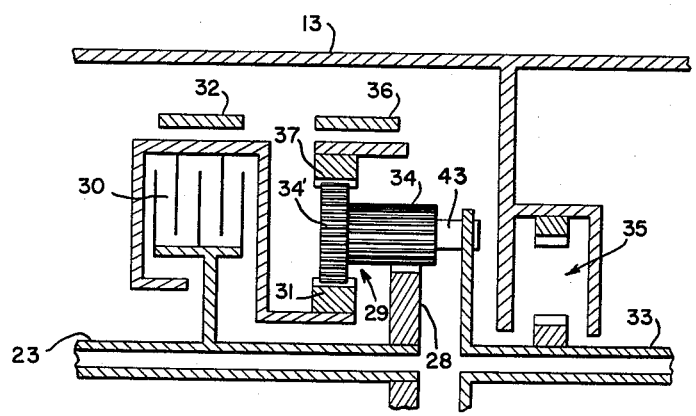
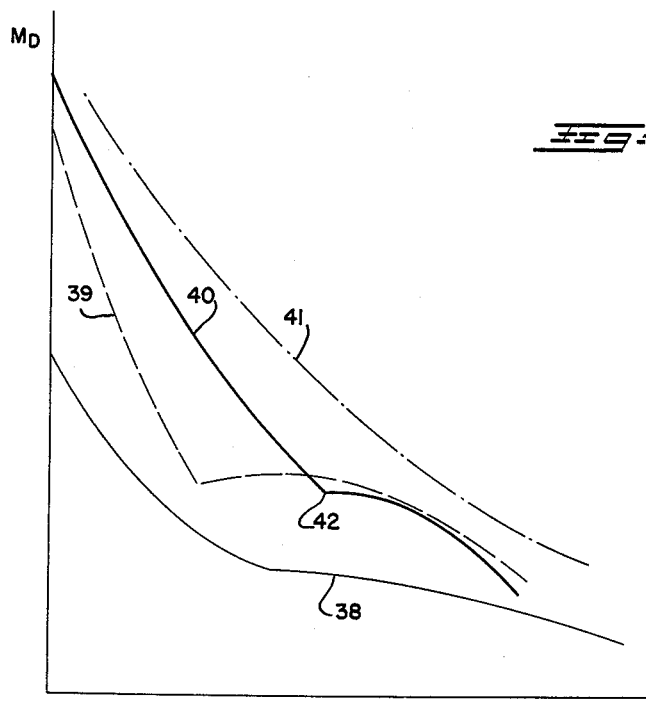
INVENTOR
HANS-JOACHIM M. FÖRSTER
BY *Deuere and Craig*
ATTORNEYS

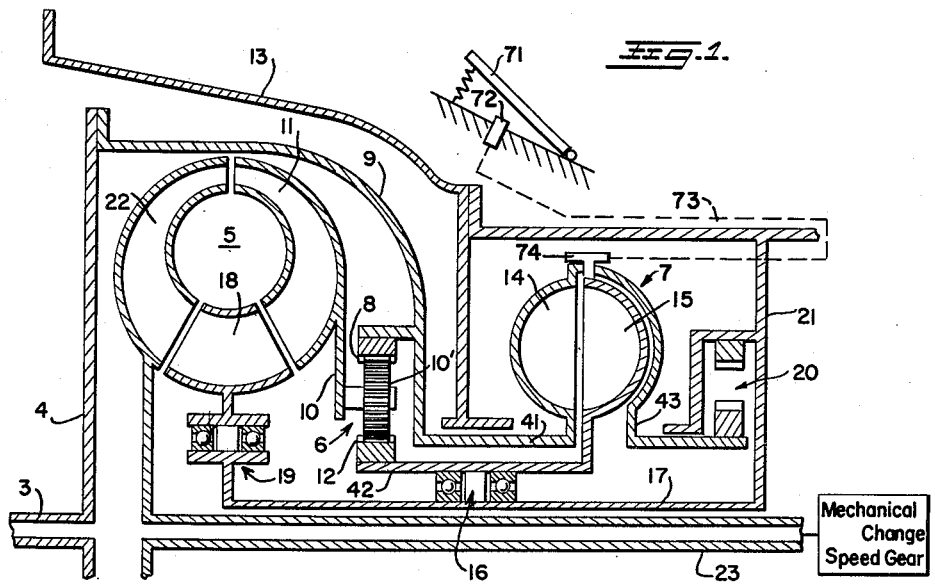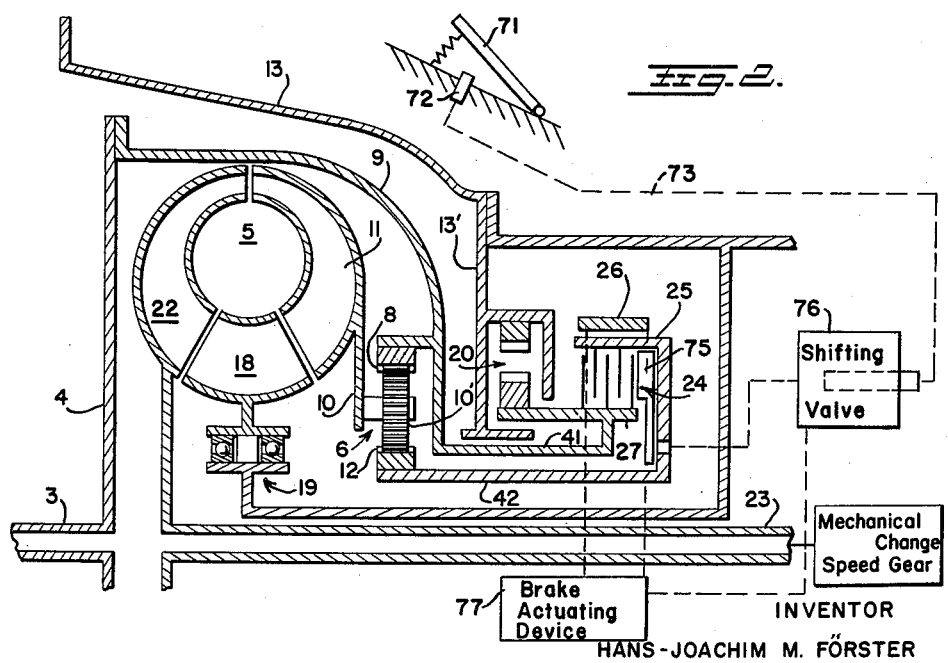

United States Patent Office 3,107,555
Patented Oct. 22, 1963

3,107,555
CHANGE SPEED TRANSMISSION
Hans-Joachim M. Foerster, Stuttgart-Bad Cannstatt, Germany, assignor to Daimler-Benz Aktiengesellschaft, Stuttgart-Unterturkheim, Germany
Filed Oct. 14, 1957, Ser. No. 689,823
Claims priority, application Germany Oct. 13, 1956
20 Claims. (Cl. 74—732)

The present invention relates to a change speed transmission, especially for motor vehicles, which consists of a hydrodynamic unit and of a mechanical unit.

More particularly, the present invention relates to a change speed transmission for motor vehicles provided with a torque converter unit and a mechanical change speed unit in which the driving member of the torque converter may be selectively driven either at the same or at a speed different from the transmission input shaft or engine crankshaft speed to provide two differing operating ranges for the hydrodynamic unit.

Change speed gears of the type including a hydrodynamic unit and a mechanical change speed unit connected behind the hydrodynamic unit are well known in the art. Various combinations thereof have been devised in the prior art to achieve various results and to fulfill various needs and requirements. For the operation in motor vehicles with such change speed gears or transmissions it is desirable to be able to operate in one of the upper speeds of such a transmission as economically as possible, i.e., with as small a power loss in the hydrodynamic part thereof. However, with such transmissions, it has also been recognized to be desirable to provide as large as possible a power output which must be immediately available in case of danger or, for example, for purposes of passing another vehicle. In the latter case, the extent or magnitude of power loss in the transmission no longer needs to be considered as this driving condition only prevails for relatively short periods of time.

According to the present invention, a change speed gear consisting of a hydrodynamic unit and a mechanical unit is so constructed that as hydrodynamic unit a torque converter is provided and that a shiftable mechanical change speed gear is operatively connected ahead of the hydrodynamic unit, i.e., to the input of the torque converter, in such a manner that the driving member or impeller of the torque converter may be driven selectively at a relatively higher or lower rotational speed with respect to the engine rotational speed.

According to a further feature in accordance with the present invention, the change speed gear which is connected ahead of the torque converter, i.e., with the input thereof, and which will be referred to hereinafter as "input change speed gear," is a reduction change speed gear so that the relatively higher rotational speed of the driving member or impeller of the torque converter which is attainable thereby corresponds or is equal to the rotational speed of the transmission input member, connected, for instance, rigidly with the engine crankshaft. The reduction of the input change speed gear may thereby be engaged at will, for example, by pressing down the gas pedal beyond a predetermined pressure point, i.e., by "kick-down" control by means of the gas or accelerator pedal beyond a predetermined point of resistance formed, for example, by a spring-loaded abutment member.

The construction according to the present invention offers the advantage that the hydraulic torque converter is appropriately driven in the normal operating range in the upper speed or speeds of the transmission at the speed of the transmission input. As a result thereof, the driving engine is more strongly depressed in the rotational speed thereof, i.e., is forced to operate at lower speeds, and the driving power is, therefore, smaller. Correspondingly, the power loss in the torque converter is also correspondingly small.

If, for purposes of acceleration, for a short period of time a relatively large output is desired, then the point of operation of the torque converter may be displaced by the engagement of the input reduction gear providing a speed reduction, and a higher output is thereby made possible. The accompanying increase in the losses are thereby accepted in the interest of the higher output which may thereby be obtained. By the selection of an appropriate suitable speed reduction ratio in the input change speed gear, a relatively large driving output may always be obtained in the "accelerating" range and a relatively economic drive in the "normal range" of operation of the torque converter.

Accordingly, it is an object of the present invention to provide an arrangement for a change speed gear including a hydrodynamic unit and a mechanical change speed gear unit which improves the efficiency of the transmission during normal operation without sacrifice to the available driving power selectively obtainable for purposes of acceleration or in case of danger during relatively short periods of time when efficiency of the transmission is of no consideration.

A further object of the present invention is the provision of a transmission including a hydrodynamic unit and a mechanical change speed gear in which the torque versus speed characteristics of the torque converter are improved in such a manner as to approach more closely the ideal conditions thereof.

It is a further object of the present invention to provide a high efficiency normal range of operation for a torque converter unit combined with a mechanical change-speed gear connected to the output thereof and a high-power-output range of operation for the torque converter by changing the speed of the impeller thereof with respect to the input speed of transmission without the need for shifting the mechanical change speed gear connected to the output of the torque converter.

Still another object of the present invention is the provision of a simple, compact and reliable construction of the various transmission parts to achieve the purposes and aims indicated hereinabove.

A still further object of the present invention resides in the provision of an input change speed gear which is connected to the input of the hydrodynamic device, for example, of the torque converter, to permit adjustment of the speed of the driving member or impeller thereof with respect to the transmission input shaft corresponding to the speed of the driving engine so as to provide two operating ranges for the torque converter irrespective of the setting of the mechanical change speed gear unit connected to the torque converter output.

These and other objects, features and advantages of the present invention will become more obvious from the following description when taken in connection with the accompanying drawing which shows, for purposes of illustration only, several embodiments in accordance with the present invention and wherein:

FIGURE 1 is a schematic illustration of a first embodiment of the input section of a change speed gear in accordance with the present invention;

FIGURE 2 is a schematic illustration of a modified embodiment of the input section of a change speed gear in accordance with the present invention;

FIGURE 3 illustrates one type of mechanical change speed gear which may be used with either the embodiments of FIGURES 1 and 2; and FIGURE 4 is a diagram indicating the performance of a transmission in accordance with the present invention.

Referring now to the drawing, wherein like reference numerals are used throughout the various views to designate like parts, and more particularly to FIGURE 1, which illustrates the input section of a change speed gear in accordance with the present invention, reference numeral 5 generally designates the hydrodynamic device formed by a torque converter which forms part of the input section of the transmission. A change speed gear generally designated by reference numeral 6 which is connected ahead of the hydraulic torque converter 5, i.e., to the input thereof, and, therefore, is referred to hereinafter as input change speed gear or transmission, and a hydraulic coupling generally designated by reference numeral 7 also form part of the input section of the transmission. A mechanical change speed gear of any suitable construction and shown in the drawing only schematically in block diagram is connected with the output 23 of the input section of this transmission, one specific example of such mechanical change speed gear being described more particularly hereinafter with reference to FIGURE 3.

A planetary gear is provided as the input change-speed gear or transmission 6. For purposes of obtaining a speed reduction, the outer or ring gear 8 of the planetary gear 6 is thereby rigidly connected with the transmission driving member 9 whereas the driving member or impeller 11 of the torque converter 5 is connected with the planet carrier 10 of the planetary gear 6. The transmission input or driving member 9 is suitably connected with the input shaft 3 thereof which may be connected to or form part of the engine crankshaft or the like over the flange member 4. The planetary gear 6 is thereby located directly adjacent the hydraulic torque converter 5 and more particularly on the side thereof opposite the driving shaft 3. However, it is understood that the planetary gear 6 may also be arranged in another manner and at any other suitable place with respect to the torque converter 5.

The planetary gear 6 in order to produce a 1:1 transmission ratio must be adapted to be locked in itself, on the one hand, while the inner or sun gear 12 of the planetary gear must be adapted to be connected with the relatively stationary housing 13 of the transmission, on the other, so that the planet gears 10' may roll off along the sun gear 12 when the same is held stationary. These two conditions must be fulfilled, as is well known, in order to obtain a 1:1 ratio and a speed reduction between the input shaft 9 and the output shaft 10 of the planetary gear 6.

The planetary gear 6 may be locked in itself by coupling or clutching the sun gear 12 with the ring gear 8 thereof. In that case, the driving member or impeller 11 of the torque converter 5 rotates at the same speed as that of the driving shaft 3, whereas in the former case it rotates at a reduced speed with respect to the driving shaft 3. Any suitable disengageable coupling or clutch may be used for connecting the ring gear 8 with the sun gear 12 of the planetary gear 6.

In the embodiment according to FIGURE 1, a hydraulic coupling 7 is used as disengageable means for purposes of connecting the ring gear 8 with the sun gear 12. The driving member 14 of the hydrodynamic device 7 is thereby directly connected with the driving member 9 over an intermediate shaft 41. The driven or rotor member 15 of the hydrodynamic device 7 is rigidly connected with the sun gear 12 over intermediate shaft 42. The hydraulic coupling 7 may also be selectively filled or emptied in any suitable manner by any conventional control means not illustrated further in detail. In the embodiment of FIGURE 1, a kick-down control is shown schematically for illustrative purposes in which a selectively operable member, such as a gas pedal 71, operable at the will of the driver, is adated to engage with a resistance point actuator 72 of any conventional construction and design which controls in any suitable known manner by way of connection 73 the means 74 controlling the selective filling and emptying of the fluid coupling 7 in such a manner that, when the kick-down control is actuated by depressing the gas pedal 71, the fluid coupling 7 is emptied. Since arrangements controlling a hydrodynamic device such as a fluid coupling 7 in that manner are well known per se in the art and are, therefore, neither described nor illustrated herein. For purposes of decreasing the diametric dimension of the hydraulic coupling 7, the vanes thereof may be pressed forwardly or may also be inclined as is well known.

The driven member or turbine wheel 15 of the hydraulic coupling 7 may be held stationary with respect to a hollow shaft 17 by means of a one-way clutch schematically shown in the drawing and generally designated therein by reference numeral 16 whereby the hollow shaft 17 is rigidly connected with or formed integrally with the housing 13 and additional anti-friction bearings may be provided at suitably spaced points to enable frictionless rotation of shaft 42 in one direction with respect to stationary sleeve 17. In the alternative, a disengageable brake operative on the intermediate shaft 42 or the turbine wheel 15 could also be used. The reaction or guide member 18 of the hydraulic torque converter 5 also is supported against the hollow stationary shaft 17 over suitable anti-friction bearings including a one-way engaging means, such as a one-way clutch or free-wheeling device generally designated by reference numeral 19. Of course, the roller elements of one-way engaging means 16 and 19 may also serve as anti-friction support means.

The drive from the driving member 14 of the hydraulic device 7 is continued over a suitable connection 43 to the primary oil pump 20 which is arranged at the rearward terminal flange or partition wall 21 of the housing 13. The driven member or turbine 22 of the torque converter is connected with a shaft 23 which provides for the transmission of the drive to the mechanical change speed unit only shown in block diagram in FIGURE 1 and which may be of any suitable construction, either planetary gear or gears, counter shaft gears or combinations thereof and controlled in any suitable manner.

*Operation*

The operation of the embodiment according to FIGURE 1 is as follows:

For normal, economic operation or driving in the upper speed, the hydraulic coupling 7 is filled with hydraulic fluid. Consequently, the inner sun gear 12 is rotated from the driving member 9 over the hydraulic coupling 7 with practically the same rotational speed as the outer or ring gear 8. Such rotation of the sun gear 12 is permitted by the one-way clutch 16. As a result thereof, the planetary gear 6 is effectively locked in itself and the driving member or impeller 11 of the torque converter 5 rotates at the same or essentially the same speed as the driving member 9 and therewith as the drive or engine shaft 3. The torque converter 5 operates within this region with relatively small losses. Since only a fraction of the input moment or torque has to be coupled between the ring gear 8 constituting the input or driving element of the planetary gear 6 and the sun gear 12 constituting the abutment gear of the planetary gear 6, even a relatively larger slippage of the hydraulic coupling 7 has only little effect on the overall efficiency thereof.

If, for purposes of acceleration, an increased driving output is to be attained, then the hydraulic coupling 7 is selectively discharged or emptied at will, for example, by pushing down the gas or accelerator pedal 71 of the vehicle beyond a predetermined pressure point actuator 72 or point of resistance. In other words, the discharge or emptying of the hydraulic coupling 7 is realized by so-called "kick-down" control of the accelerator pedal 71 against a predetermined pressure point 72 obtained, for example, by a spring-loaded stop member in the control linkage or in the path of the accelerator pedal shown only schematically.

The one-way clutch 16 becomes operative when the sun gear 12 seeks to reverse its direction of rotation by reason of the increase in rotational speed of the engine and therewith of the input shaft 3 and transmission driving member 9. Consequently, the one-way clutch 16 prevents a reverse rotation of the inner or sun gear 12 and therewith supports the same in a non-rotatable manner against the housing 13, i.e., holds the shaft 42 and therewith the sun gear 12 non-rotatably against the hollow stationary shaft or sleeve 17. The planetary gear 6 thereby becomes effective as a speed reduction gear so that the driving member or impeller 11 of the torque converter 5 rotates at a reduced speed with respect to the driving member 9 and the drive shaft 3 accompanied by an increased input torque. As a result thereof, the point of operation of the hydraulic torque converter 5 is displaced in the sense of an increase in the driving output. The desired acceleration is available thereby without changing back to a lower speed in the mechanical transmission section. After termination of the passing operation or accelerating phase, the pre-existing condition, namely, the condition in which the driving member or impeller 11 of the torque converter 5 again operates at the same speed as the driving member 9, is re-established by either releasing the gas pedal or automatically upon exceeding a predetermined vehicle speed, such automatic re-establishment being obtained by any suitable conventional automatic control arrangement.

FIGURE 2 shows the input section of a transmission of a modified embodiment in accordance with the present invention which operates on the same principles as the embodiment of FIGURE 1. However, in the place of the hydraulic coupling 7, a disengageable mechanical clutch generally designated by reference numeral 24 is arranged between the inner or sun gear 12 and the outer or ring gear 8 of the planetary gear 6, whereby the clutch 24 may be constructed as a friction disk clutch. The clutch part 25 of clutch 24 which is connected with the sun gear 12 over intermediate shaft 42 may at the same time serve as brake drum which may be braked by the brake member 26 of suitable construction to hold the clutch part 25 and therewith the sun gear 12 stationary with respect to the housing 13. The oil pump 20 is disposed in this embodiment along the partition wall or cover 13' of the casing part enclosing the hydraulic torque converter 5 and separating the same from the mechanical transmission section. The oil pump 20 is again drivingly connected with the input half 27 of the clutch 24 which input half 27 is rigidly connected over intermediate shaft 41 with the driving member 9 and therewith with the driving or input shaft 3.

*Operation*

The operation of the embodiment in accordance with FIGURE 2 is the same as that of FIGURE 1. During normal driving operation, the clutch 24 is engaged by fluid pressure supplied to clutch actuator 75 from any suitable source (not shown) by way of a shifting valve of conventional construction and shown only schematically by block 76 so that a planetary gear 6 is locked in itself and the driving member or impeller 11 of the torque converter 5 is driven at the same rotational speed as the drive shaft 3. For purposes of acceleration, the gas pedal 71 is again kicked down against the pressure point actuator 72 which, in turn, by way of connection 73 actuates the shifting valve 76 to thereby relieve fluid pressure from actuator 75 while, at the same time, applying the fluid pressure to the brake-actuating device 77 to render the latter effective whereby the clutch 24 is then disengaged and instead the brake 26 is engaged. As a result thereof, the rotational speed of the impeller or driving member 11 of torque converter 5 is now reduced by the planetary gear 6 with respect to the rotational speed of the drive shaft 3.

It should be noted that a division or branching of the driving power or torque does not occur in either of the two embodiments of FIGURES 1 and 2. The entire output or torque is always transmitted through the torque converter 5.

A mechanical transmission or change speed gear of any suitable construction, such as a planetary, counter shaft or combined planetary and counter shaft change speed gear is connected with the output of the input section of the transmission illustrated in FIGURES 1 and 2, and more particularly, with the output shaft 23 thereof. While such transmission may be of any suitable type, FIGURE 3 illustrates one preferred embodiment of a planetary type change speed gear which may be used advantageously with the input section of the embodiments of either FIGURES 1 and 2.

In the embodiment according to FIGURE 3, the torque converter output shaft 23 rigidly connected with the driven or turbine member 22 of the torque converter 5 is connected with sun gear 28 of a planetary gear generally designated by reference numeral 29. The planetary gear 29 includes a further sun gear 31 disposed alongside sun gear 28 on the side facing the hydrodynamic section which is adapted to be connected with the shaft 23 over disengageable clutch 30. The clutch 30 thereby serves to lock the planetary gear 29 in itself. A brake member 32 is arranged at the clutch 30 by means of which the further sun gear 31 may be held non-rotative with respect to the stationary transmission casing 13. The planetary gear 29 further includes one or several twin planet gears 34, 34' which engage with the sun gear 28 with the smaller planet gears 34 thereof and which engage with both the sun gear 31 and ring gear 37 with the larger planet gears 34' thereof. The output shaft 33 is connected with the planet carrier 43 of the planetary gear 29.

*Operation*

The planet gear 29 can be alternately shifted to two different forward speeds by means of engagement of clutch 30 producing a direct drive through the planetary gear and by means of engagement of brake 32 which produces a change in the transmission ratio by reason of the fact that the planetary gear 34' and therewith the planetary gear 34 and the planet carrier 37 roll off along the stationary sun gear 31 when the brake 32 is engaged.

The secondary oil pump 35 is arranged at the output shaft 33 with which it is drivingly connected. A further brake 36 which is operative on the outer or ring gear 37 of the planetary gear 29 permits the attainment of a reverse speed when the brake 36 is engaged and clutch 30 as well as brake 32 disengaged.

Thus, the change speed gear of FIGURE 3 provides two forward speeds and a reverse speed which may be engaged selectively or automatically in any suitable manner, for example, in response to the vehicle speed and/or engine speed and/or in response to the torque produced by the engine. Moreover, the semi-automatic or automatic control system of the mechanical change speed gear, for example, as illustrated in FIGURE 3, may be connected and combined with that of the hydrodynamic section illustrated in FIGURES 1 and 2.

FIGURE 4 is a diagram in which the torque $M_D$ is plotted against the velocity V of a hydrodynamic section in accordance with the present invention as compared to other transmissions. The full line 38 thereby represents the characteristic curve of a torque converter without additional change speed gear, i.e., of a conventional torque converter. The dash line 39 illustrates the characteristic curve for a torque converter which operates, for example, with a speed reduction of 1:1.5 arranged behind the torque converter, i.e., in the output thereof. The full line 40 represents the characteristics of the transmission in accordance with the present invention in which a speed reduction of, for example, 1:1.5 is arranged ahead of or at the input of the torque converter. It may be seen therefrom that the line 40 comes closest to the ideal torque-characteristic hyperbola 41 shown in dot and dash line in FIGURE 4. This is due to the displacement of the point 42 of operation of the torque converter characteristics in the sense of an increase in the driving output which is attained by reason of the change speed gear arranged in the input of the torque converter. This diagram also clearly indicates that the various advantages obtainable by the present invention are not obtained by the mere addition of a reduction change speed gear but above all by the particular arrangement in accordance with the present invention which is predicated on the particular connection of the reduction change speed gear in the input of the torque converter.

While I have shown and described several embodiments in accordance with the present invention, it is understood that the same is not limited thereto but is susceptible of many changes and modifications within the spirit of the present invention and I intend to cover all such changes and modifications as encompassed by the appended claims.

I claim:

1. A change-speed transmission, especially for motor vehicles, provided with a hydrodynamic unit including a torque converter and with a selectively engageable mechanical change-speed gear unit and adapted to provide for said change-speed gear unit two different operating ranges of torque transmission by said torque converter consisting of a first, relatively efficient operating range thereof and of a second, relatively less efficient operating range thereof making available temporarily a relatively larger driving output power without change in the transmission ratio of said mechanical change-speed gear unit, comprising impeller means, turbine means and reaction means in the said torque converter, said selectively engageable change-speed gear unit being operatively connected only with said turbine means of said hydrodynamic unit, transmission input means for applying thereto the driving torque, change-speed reduction-gear means actuatable independently of said selectively engageable change speed gear, and connecting means including said change-speed reduction-gear means operatively connecting said input means only with said impeller means, and selectively engageable means operatively associated with said change-speed reduction-gear means and operable at the will of the driver for selectively operating said impeller means, under any driving condition and at any driving speed, either at the speed of said input means during normal operating conditions thereof in said first operating range or at a lower speed with respect thereto during abnormal driving conditions in said second operating range requiring a relatively larger driving output irrespective of the speed engaged in said selectively engageable mechanical change-speed gear unit.

2. A change speed transmission according to claim 1, wherein said change speed gear means is a planetary gear having a plurality of rotatable elements including a planet carrier connected with said impeller means.

3. A change speed gear according to claim 2, wherein said planetary gear includes a ring gear and a sun gear, and wherein said input means is connected with said ring gear.

4. A change speed transmission according to claim 3, wherein said selectively engageable means includes engageable means operatively connected with said sun and ring gear substantially locking together said planetary gear.

5. A change speed transmission according to claim 4, wherein said engageable means is a hydrodynamic coupling with means for selectively filling and discharging the same.

6. A change speed transmission according to claim 4, wherein said engageable means is a mechanical friction disk clutch.

7. A change speed transmission according to claim 1, wherein said change speed gear means includes a planetary gear having a plurality of rotatable elements including reaction gear, and means for holding said reaction central gear stationary with respect to the transmission housing.

8. A change speed transmission according to claim 1, wherein said reaction means includes a stator member, and one-way engaging means for supporting said stator member at a relatively stationary part of the transmission.

9. A change speed transmission according to claim 1, wherein said mechanical change speed transmission unit includes a planetary gear having a plurality of rotatable elements.

10. A change speed transmission according to claim 9, wherein said change speed transmission unit includes planetary gear means having two sun gears, a ring gear and two planet gears operatively connected with each other, one planet gear being in meshing engagement with one of said sun gears and said ring gear and the other planet gear being in meshing engagement with the other sun gear, and means operatively connected with said planetary gear means to selectively produce different transmission ratios in said planetary gear means.

11. A change speed transmission according to claim 1, wherein said change speed gear means is arranged directly adjacent said torque converter.

12. A change speed transmission, especially for motor vehicles, including a hydrodynamic torque converter having an input member and an output member, a mechanical change speed gear with shifting means for engaging the respective speeds thereof and operatively connected with the output member of said hydrodynamic unit, transmission input means, speed-reduction change speed gear means actuatable independently of said shifting means, and means including said speed-reduction change-speed gear means operatively connecting said transmission input means only with the input member of said torque converter, and driver-operated selectively operable means operatively associated with said speed-reduction change-speed gear means for selectively shifting said input member to operate, under any driving condition, at either the speed of said transmission input means during normal operating conditions or at a reduced speed with respect to said transmission input means during abnormal operating conditions for purposes of making available a temporary, relatively large power output at every driving speed.

13. A change speed transmission according to claim 12, wherein said change speed gear means includes a planetary gear with the planet carrier thereof connected with said input member and with the ring gear thereof connected to said transmission input means.

14. A change speed transmission according to claim 13, wherein said planetary gear includes a sun gear and fluid coupling means selectively coupling said sun gear to said ring gear.

15. A change speed transmission, especially for motor vehicles, including a hydrodynamic torque converter having an input member and an output member, a mechanical change speed gear with shifting means for engaging the respective speeds thereof and operatively connected with the output member of said hydrodynamic unit, transmission input means, change speed gear means actuatable independently of said shifting means and connecting said transmission input means with said input member, and selectively operable means operatively associated with said change-speed gear means for selectively shifting said input member to operate, under any driving condition, at either the speed of said transmission input means or at a reduced speed with respect to said transmission input means for purposes of making available a temporary, relatively large power output at every driving speed, said change speed gear means including a planetary gear with the planet carrier thereof connected with said input member and with the ring gear thereof connected to said transmission input means, a sun gear, and means for selectively connecting said sun gear with said ring gear or with a relatively stationary part of said transmission.

16. A change speed transmission, especially for motor vehicles, with a mechanical change speed gear unit and a hydrodynamic torque converter operatively connected ahead of said mechanical change speed gear unit and including impeller means, transmission input means, means including mechanical change-speed gear means operatively connecting said transmission input means with said impeller means, said change speed gear means including an input member operatively connected with said transmission input means and an output member operatively connected with said impeller means and adapted to be driven either at the speed of said transmission input means or at a relatively lower speed with respect thereto, selectively engageable means for operating said mechanical change speed gear means either as a one-to-one transmission or as a speed reduction gear, and actuating means including kick-down control means operating independently of the speed engaged in said mechanical change speed gear unit and operatively associated with said selectively engageable means for temporarily shifting said mechanical change speed gear means to operate, at any driving speed, as a reduction gear and thereby make available in said torque converter temporarily a relatively large torque conversion in said torque converter temporarily a relatively large torque conversion under any driving condition and irrespective of the speed engaged in said mechanical change speed gear unit.

17. A change speed transmission according to claim 16, wherein said mechanical change speed gear means is a planetary gear having a plurality of rotatable elements, and wherein said selectively engageable means includes clutch means operatively connecting two of said rotatable elements with one another and brake means for braking one of said two rotatable elements upon disengagement of said clutch means.

18. A change-speed transmission, especially for motor vehicles, provided with a hydrodynamic unit including a torque converter and with a selectively engageable mechanical change-speed gear unit and adapted to provide for said change-speed gear unit two different operating ranges of torque transmission by said torque converter consisting of a first, relatively efficient operating range thereof and of a second, relatively less efficient operating range thereof making available a relatively larger driving output without change in the transmission ratio of said mechanical change-speed gear unit, comprising impeller means, turbine means and reaction means in said torque converter, said selectively engageable change-speed gear unit being operatively connected with said turbine means of said hydrodynamic unit and including a first sun gear operatively connected with said turbine means, a second sun gear, a ring gear, a first planet gear in meshing engagement with said ring gear and said second sun gear, a second planet gear operatively connected for rotation in unison with said first planet gear and in meshing engagement with said first sun gear, a planet carrier for said planet gears, output means operatively connected with said planet carrier, disengageable means for selectively braking said ring gear, and further disengageable means for selectively connecting together said two sun gears, transmission input means for applying thereto the driving torque, change-speed reduction gear means actuatable independently of said selectively engageable change-speed gear, connecting means including said change-speed reduction gear means operatively connecting said input means only with said impeller means, and driver-operated selectively operable means operatively associated with said change-speed reduction-gear means for selectively operating said impeller means, under any driving condition and at any driving speed, either at the speed of said input means during normal operating conditions thereof in said first operating range or at a lower speed with respect thereto during abnormal driving conditions in said second operating range requiring a relatively larger driving output irrespective of the speed engaged in said selectively engageable mechanical change-speed gear unit.

19. A change-speed transmission, especially for motor vehicles, provided with a hydrodynamic unit including a torque converter and with a selectively engageable mechanical change-speed gear unit and adapted to provide for said change-speed gear unit two different operating ranges of torque transmission by said torque converter consisting of a first, relatively efficient operating range and of a second relatively less efficient operating range thereof making available a relatively larger driving output power without change in the transmission ratio of said mechanical change-speed gear unit, comprising impeller means, turbine means and reaction means in said torque converter, said selectively engageable change-speed gear unit being operatively connected with said turbine means of said hydrodynamic unit, transmission input means for applying thereto the driving torque, change-speed reduction gear means actuatable independently of said selectively engageable change-speed gear unit, connecting means including said change-speed reduction gear means operatively connecting said input means only with said impeller means to thereby selectively operate said impeller means at either the speed of said input means during normal operating conditions thereof in said first operating range or at a lower speed with respect thereto during abnormal driving conditions in said second operating range requiring a relatively larger driving output irrespective of the speed engaged in said selectively engageable mechanical change-speed gear unit, and driver-operated kick-down control means operatively connected with said change-speed reduction-gear means for shifting said change-speed reduction-gear means from direct drive to speed reducing drive at any driving speed upon actuation of said kick-down control means.

20. A change-speed transmission, especially for motor vehicles, provided with a hydrodynamic unit including a torque converter and with a selectively engageable mechanical change-speed gear unit and adapted to provide for said change-speed gear unit two different operating ranges of torque transmission by said torque converter consisting of a first, relatively efficient, operating range thereof and of a second, relatively less efficient, operating range thereof making available temporarily a relatively larger driving output power without change in the transmission ratio of said mechanical change-speed gear unit, comprising impeller means, turbine means and reaction means in the said torque converter, said selectively engageable change-speed gear unit being operatively connected only with said turbine means of said hydrodynamic unit, transmission input means for applying thereto the driving torque, change-speed reduction-gear means actuatable independently of said selectively engageable change-speed gear unit, connecting means including said change-speed reduction-gear means operatively connecting said input means only with said impeller means to thereby selectively operate said impeller means either at the speed of said input means during normal operating conditions thereof in said first operating range or at a lower speed with respect thereto during abnormal driving conditions in said second operating range requiring a relatively larger driving output irrespective of the speed engaged in said selectively engageable mechanical change-speed gear unit, and means for selectively engaging the lower rotational speed of said change-speed gear means by depressing the gas pedal of the vehicle beyond a predetermined pressure point.

References Cited in the file of this patent

UNITED STATES PATENTS

| | | |
|---|---|---|
| 2,325,876 | Pollard | Aug. 3, 1943 |
| 2,388,204 | Barnes | Oct. 30, 1945 |
| 2,397,634 | Voytech | Apr. 2, 1946 |
| 2,597,921 | Churchill et al. | May 27, 1952 |
| 2,606,459 | Carnegie | Aug. 12, 1952 |
| 2,612,792 | Wilson et al. | Oct. 7, 1952 |
| 2,664,765 | Kelbel | Jan. 5, 1954 |
| 2,694,949 | McFarland | Nov. 23, 1954 |
| 2,749,773 | Simpson | June 12, 1956 |
| 2,768,534 | Orr | Oct. 30, 1956 |
| 2,851,906 | De Lorean | Sept. 16, 1958 |
| 2,873,618 | De Lorean | Feb. 17, 1959 |
| 2,876,656 | Herndon | Mar. 10, 1959 |
| 2,919,607 | Moore | Jan. 5, 1960 |
| 2,932,220 | Nash | Apr. 12, 1960 |